(12) United States Patent
Son et al.

(10) Patent No.: US 9,032,562 B2
(45) Date of Patent: May 19, 2015

(54) VALVE CONTROL SYSTEM, BIDET USING THE SAME, AND VALVE CONTROL METHOD

(75) Inventors: Joung-Ho Son, Seoul (KR); In-Seok Seo, Seoul (KR); Ki-Chul Kim, Seoul (KR)

(73) Assignee: Woongjin Coway Co., Ltd (KR)

( * ) Notice: Subject to any disclaimer, the term of this patent is extended or adjusted under 35 U.S.C. 154(b) by 245 days.

(21) Appl. No.: 13/805,947

(22) PCT Filed: Jun. 29, 2011

(86) PCT No.: PCT/KR2011/004740
§ 371 (c)(1),
(2), (4) Date: Dec. 20, 2012

(87) PCT Pub. No.: WO2012/002721
PCT Pub. Date: Jan. 5, 2012

(65) Prior Publication Data
US 2013/0091628 A1     Apr. 18, 2013

(30) Foreign Application Priority Data

Jun. 30, 2010   (KR) .................. 10-2010-0063119
Jun. 28, 2011   (KR) .................. 10-2011-0062828

(51) Int. Cl.
| | | |
|---|---|---|
| A47K 3/022 | (2006.01) | |
| E03B 1/00 | (2006.01) | |
| F16K 15/00 | (2006.01) | |
| E03D 9/08 | (2006.01) | |
| F16K 17/20 | (2006.01) | |

(Continued)

(52) U.S. Cl.
CPC . *E03D 9/08* (2013.01); *F16K 17/20* (2013.01); *F16K 37/0091* (2013.01); *E03B 7/071* (2013.01)

(58) Field of Classification Search
CPC ....... E03D 9/08; E03B 7/071; F16K 37/0091; F16K 17/20
USPC .................................................. 4/420.4, 443
See application file for complete search history.

(56) References Cited

U.S. PATENT DOCUMENTS 5,060,507 A * 10/1991 Urmson et al. .............. 73/24.01
7,826,986 B2 * 11/2010 McDonald ..................... 702/45

(Continued)

FOREIGN PATENT DOCUMENTS

| KR | 1020050078804 | 8/2005 |
| KR | 1020100033201 | 3/2010 |

OTHER PUBLICATIONS

PCT/ISA/237 Written Opinion issued on PCT/KR2011/004740 (pp. 3).

(Continued)

*Primary Examiner* — Huyen Le
*Assistant Examiner* — Christine Skubinna
(74) *Attorney, Agent, or Firm* — The Farrell Law Firm, P.C.

(57) ABSTRACT

There are provided a valve control system, a bidet using the same, and a valve control method. The valve control system includes a latch valve controlling a stream of water in a pipe; a flow rate sensor measuring a flow rate in the pipe; and a valve control device controlling the operation of the latch valve. The valve control device determines whether or not the latch valve is malfunctioning upon analyzing a flow rate measured by the flow rate sensor. When the latch valve is malfunctioning, the valve control device controls the latch valve to re-operate.

10 Claims, 2 Drawing Sheets

(51) Int. Cl.
  *F16K 37/00* (2006.01)
  *E03B 7/07* (2006.01)

(56) References Cited

U.S. PATENT DOCUMENTS

2003/0057765 A1    3/2003  Mortenson et al.
2005/0150557 A1    7/2005  McDaniel et al.
2006/0207006 A1*   9/2006  Koga et al. .................. 4/420.4
2007/0221467 A1    9/2007  Stevenson et al.
2008/0047055 A1    2/2008  Lim

OTHER PUBLICATIONS

PCT/ISA/210 Search Report issued on PCT/KR2011/004740 (pp. 3).

* cited by examiner

VALVE CONTROL SYSTEM, BIDET USING THE SAME, AND VALVE CONTROL METHOD

TECHNICAL FIELD

The present invention relates to a valve control system, a bidet using the same, and a valve control method, and, more particularly, to a control system and method for feeding back an operation of a latch valve to thus prevent the latch valve from malfunctioning.

BACKGROUND ART

A conventional bidet receives power through an external power source (AC100~240V) to operate a heater, or the like, and converts the power to DC 5~24V to use it as a power source for internal electronic components and a panel board assembly (PBA). In this case, however, some houses do not have a power supply facility in a location in which a bidet is to be installed or some people in particular regions are reluctant to use electricity in rest rooms, so they choose not to use the bidet.

To solve these problems, a bidet having a self-generation function has been proposed. The bidet having a self-generation function can overcome restrictions in locations where power supply is not smooth and stimulate those who are reluctant to use electricity in rest rooms to use the bidet.

DISCLOSURE OF INVENTION

Technical Problem

An aspect of the present invention provides a valve control system, a bidet using the same, and a valve control method capable of feeding back an operation of a latch valve to thus prevent the latch valve from malfunctioning.

Solution to Problem

According to an aspect of the present invention, there is provided a valve control system including: a latch valve controlling a water current (or a stream of water) in a pipe; a flow rate sensor measuring a flow rate in the pipe; and a valve control device determining that the latch valve is malfunctioning if a flow rate value measured by the flow rate sensor is not within a pre-set flow rate value range corresponding to a valve operation, and controlling the latch valve to re-operate in the occurrence of a malfunction.

The valve control device may include: a signal generator generating a control signal for controlling an operational state of the latch valve; and one of a first counter measuring the number of re-operations of the latch valve and a second counter measuring a timing at which the flow rate of the stream of water is to be measured.

The valve control device may further include: a comparator comparing a flow rate value measured by the flow rate sensor with a first or second reference flow rate value, wherein the first reference flow rate value may be used when the latch valve performs a shutting operation and may be a maximum flow rate value allowed when the latch valve is shut, and the second reference flow rate value may be used when the latch valve performs an opening operation and may be a minimum flow rate value guaranteed when the latch valve is open.

When the number of re-operations of the latch valve measured by the first counter exceeds a pre-set number, the valve control device may control the latch valve to operate in a reverse direction to a previous operation direction.

The latch valve may operate upon receiving power from an external power source or upon receiving power from a power supply device which generates power by using a stream of water in the pipe and supplies the generated power.

According to another aspect of the present invention, there is provided a bidet comprising: a control device controlling an operation of the bidet upon receiving information regarding a user's bidet manipulation and one or more of a waterway pipe supplying water required for operating the bidet, wherein one or more of the waterway pipe includes: one or more of latch valve controlling a stream of water in the waterway pipe, respectively; and one or more of flow rate sensor measuring a flow rate in the waterway pipe, wherein when the control device determines that the latch valve is malfunctioning if a flow rate value measured by the flow rate sensor is not within a pre-set flow rate value range corresponding to a valve operation, and performs a function of controlling the latch valve to re-operate in the occurrence of the malfunction.

The control device may include: a signal generator generating a control signal for controlling an operational state of the latch valve; and one of a first counter measuring the number of re-operations of the latch valve and a second counter measuring a timing at which the flow rate of the stream of water is to be measured.

The control device may further include: a comparator comparing a flow rate value measured by the flow rate sensor with a first or second reference flow rate value, wherein the first reference flow rate value may be used when the latch valve performs a shutting operation and may be a maximum flow rate value allowed when the latch valve is shut, and the second reference flow rate value may be used when the latch valve performs an opening operation and may be a minimum flow rate value guaranteed when the latch valve is open.

When the number of re-operations of the latch valve measured by the first counter exceeds a pre-set number, the control device may control the latch valve to operate in a reverse direction to a previous operation direction.

The latch valve may operate upon receiving power from an external power source or upon receiving power from a power supply device which generates power by using a stream of water in the waterway pipes and supplies the generated power.

According to another aspect of the present invention, there is provided a valve control method using a valve control system including a latch valve and a flow rate sensor installed in a waterway pipe, including: a valve operation step of opening or shutting the latch valve; and a malfunction determination step of determining that the latch valve is malfunctioning if a flow rate value measured by the flow rate sensor is not within a pre-set flow rate value range corresponding to a valve operation, wherein when the latch valve has malfunctioned, the valve operation step is performed again.

The malfunction determination step may include: a flow rate measurement step of measuring a flow rate when a pre-set time has elapsed after the valve operation step or the valve re-operation step was performed; and an operation discrimination step of discriminating whether or not the latch valve is malfunctioning upon comparing the measured flow rate value with the pre-set flow rate value.

The operation discrimination step may include: a shutting operation determination step of determining that the latch valve is malfunctioning when the latch valve performs an shutting operation and a measured flow rate is greater than a first reference flow rate; and an opening operation determination step of determining that the latch valve is malfunctioning when the latch valve performs an opening operation and a measured flow rate is smaller than a second reference flow rate, wherein the first reference flow rate value may be used when the latch valve performs a shutting operation and may be a maximum flow rate value allowed when the latch valve is shut, and the second reference flow rate value may be used when the latch valve performs an opening operation and may be a minimum flow rate value guaranteed when the latch valve is open.

The valve control method may further include: a valve reverse operation step of performing a reverse operation of the operation performed when the valve operation step was performed by more than a pre-set number of times.

When the valve reverse operation step is performed, the number of times the valve operation step has been performed may be initialized.

After the valve reverse operation is performed, when a pre-set delay time has elapsed, the valve operation step is performed.

The latch valve may operate upon receiving power from an external power source or upon receiving power from a power supply device which generates power by using a stream of water in the waterway pipe and supplies the generated power.

Advantageous Effects of Invention

According to exemplary embodiments of the invention, whether or not the latch valve is malfunctioning is determined through the feedback control method, and when the latch valve is malfunctioning, an additional operation can be performed to correct the malfunctioning of the latch valve. Thus, even when a driving torque is weak, a precise operation of the latch valve can be guaranteed.

In addition, the valve control system, the bidet using the same, and the valve control method can be applicable to a bidet without power, or the like, in which there is a high probability that a valve will malfunction, and when applied, a usage available time of the bidet without power can be lengthened.

BEST MODE FOR CARRYING OUT THE INVENTION

Figure 1:
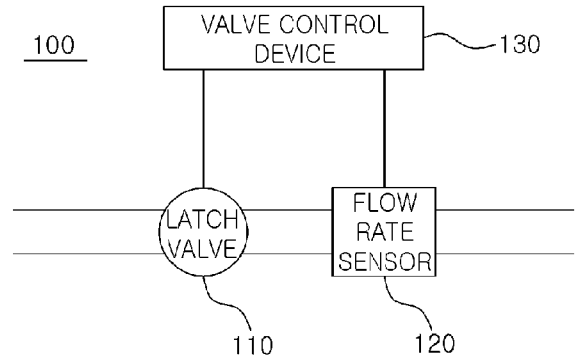
FIG. 1 is a schematic block diagram of a valve control system according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Throughout the specification and claims, unless explicitly described to the contrary, the word comprise , and variations such as comprises or comprising , will be understood to imply the inclusion of stated elements but not the exclusion of any other elements.

As for a bidet having a self-generation function, the bidet can be continuously used when a generation capacity of the bidet is greater than a power usage of the bidet. In this case, however, since the generation capacity of the self-generative bidet is very small, the power usage of the bidet is required to be minimized.

Thus, preferably, the bidet, which is not provided with power from an external source, uses a latch valve operable at a low voltage with a small amount of power in order to reduce power consumption. Here, for the latch valve to perform a smooth operation, while overcoming an obstacle which may be generated or take place in an operational environment, a driving torque of a certain amount or greater must be guaranteed.

In operating the latch valve, voltage is a factor for determining the driving torque of the latch valve, so that when the latch valve is driven at a low voltage, the driving torque of the latch valve is lowered.

Thus, if a fine problem arises in the interior of a waterway pipe or with the latch valve, the latch valve is highly unlikely to operate smoothly. In the case of a conventional bidet, the voltage for driving the latch valve is sufficiently high, providing a high driving torque, but a bidet without power may have a low driving voltage, which is problematic.

Referring to the problem arising in the interior of the waterway pipe or with the latch valve, for example, a fine iron component may be accumulated in the interior of the waterway pipe in the process of filtering water by using a permanent magnet, and when such iron components are heaped up at a portion where the latch valve is fastened, the latch valve may malfunction.

In addition, the shape of the waterway pipe and the latch valve may be minutely deformed in a hot area or a cold area, which may cause the latch valve to malfunction.

In addition, the conventional control system for a latch valve operation may be configured as an open loop. In this respect, since sufficient driving voltage and driving torque are guaranteed in the conventional bidet, there is no problem with the latch valve operation.

However, in the case of the bidet without power, it is difficult to obtain sufficient driving torque, so the bidet without power is required to be implemented with a feedback control system in which whether or not the latch valve has operated normally can be determined and when the latch valve has malfunctioned, the malfunction can be corrected.

Thus, the valve control system according to an exemplary embodiment of the present invention may be implemented as a feedback control system.

Accordingly, the controlling performance of the latch valve can be enhanced and a product liability (PL) incident which may take place when a consumer uses a product can be prevented in advance.

FIG. 1 is a schematic block diagram of a valve control system according to an exemplary embodiment of the present invention.

With reference to FIG. 1, the valve control system according to an exemplary embodiment of the present invention may be configured to include a latch valve 110, a flow rate sensor 120, and a valve control device 130.

The latch valve 110 may be able to control a stream of water in a waterway pipe. The latch valve 110 may shut the waterway pipe to interrupt the flow of water or may open the waterway pipe to allow the water to flow according to external power and a control signal. Namely, the latch valve 110 may serve as an ON/OFF switch with respect to the flow of water. Thus, unlike general valves, the latch valve 110 can be operated smoothly at a low voltage and with low power when the torque working at an initial stage of driving of the latch valve is guaranteed.

Also, the latch valve 100 may operate upon receiving power from an external power source or upon receiving power from a power source device (not shown) which generates power by using the stream of water in the waterway pipe and supplies the generated power. The bidet without power includes a power source device which generates power by using the stream of water in the waterway pipe, and units or devices within the bidet without power may be able to operate upon receiving power from the power source device. However, when the power of the bidet without power is insufficient, the bidet without power may be provided with power from an external source as necessary.

The flow rate sensor 120 may be able to measure a flow rate in the waterway pipe. The flow rate sensor 120 may be installed in an insertion manner or non-insertion manner into the waterway pipe. The flow rate sensor 120 may measure a flow rate in the waterway pipe to determine whether or not the flow of water in the waterway pipe has been changed by the latch valve 110. The flow rate sensor 120 may be positioned at a rear stage or front stage of the latch valve 110.

The valve control device 130 may transmit a control signal to the latch valve 110 to control an operation of the latch valve 110, and may control a flow of power transferred to the latch valve 110 as necessary.

The valve control device 130 may receive flow rate data measured by the flow rate sensor 120 and analyze it to determine whether or not the latch valve 110 has malfunctioned. When it is determined that the latch valve 110 has malfunctioned, the valve control device may control the latch valve 110 to operate or operate in reverse.

The valve control device 130 may control a measurement timing of the flow rate sensor 120. This is because the stream of water can be stabilized after a certain period of time has elapsed since the latch valve 110 was shut or open. Namely, a precise flow rate can be measured when the stream of water is stabilized.

Figure 2:
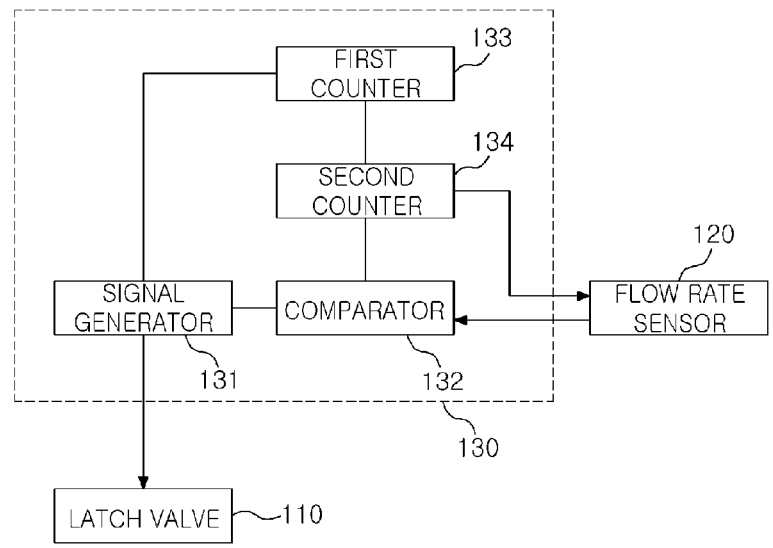
FIG. 2 is a schematic block diagram of a valve control device according to an exemplary embodiment of the present invention.

FIG. 2 is a schematic block diagram of a valve control device according to an exemplary embodiment of the present invention.

With reference to FIG. 2, the valve control device 130 may be configured to include a signal generator 131, a comparator 132, a first counter 133, and a second computer 134.

The signal generator 131 may generate a control signal for controlling the latch valve 110. Namely, the signal generator 131 generates a control signal and transfers it to the latch valve 110. Then, the latch valve 110 may open or shut the waterway pipe according to the received control signal.

The comparator 132 checks whether or not the latch valve 110 is malfunctioning by comparing a flow rate value measured by the flow rate sensor 120 with a first or second reference flow rate value.

When the latch valve 110 performs a shutting operation, a maximum value of a flow rate value of the stream of water in the waterway pipe when the shutting operation has been normally performed is the first reference flow rate value. Thus, when the latch valve 110 is controlled to perform the shutting operation, if a flow rate value measured by the flow rate sensor 120 is equal to or greater than the first reference flow rate value, the comparator 132 may determine that the latch valve 110 has malfunctioned.

When the latch valve 110 performs an opening operation, a minimum value of a flow rate value of the stream of water in the waterway pipe when the opening operation has been normally performed is the second reference flow rate value. Thus, when the latch valve 110 is controlled to perform the opening operation, if a flow rate value measured by the flow rate sensor 120 is smaller than the second reference flow rate value, the comparator 132 may determine that the latch valve 110 has malfunctioned.

The information regarding whether or not the latch valve 110 has malfunctioned, obtained through the comparison by the comparator 132 may be transferred to the signal generator 131. Then, the signal generator 131 may generate a control signal for controlling the latch valve 110 to re-operate or operate in reverse.

When the latch valve 110 has malfunctioned, the first counter 133 checks the number of times the latch valve 110 is instructed to re-operate by the signal generator 131. When the number of times the latch valve 110 is instructed to re-operate is equal to or greater than a pre-set number, the first counter 133 transfers the foregoing information to the signal generator 131. Upon receiving the information, the signal generator 131 generates a control signal for controlling the latch valve 110 to operate in reverse.

For example, when the larch valve 110 erroneously performs an opening operation and the malfunction of the latch valve 110 is still detected even after the latch valve 110 performs the opening operation again three times, the signal generator 131 generates a control signal for controlling the latch valve 110 to perform a shutting operation.

When a certain period of time has elapsed after the signal generator 131 generated the signal, the second counter 134 checks a timing to allow the flow rate sensor 120 to operate. For example, when one second has passed after the latch valve 110 transmitted the control signal for the opening operation, the second counter 134 transmits a control signal for controlling the flow rate sensor 120 to measure a flow rate.

The valve control system 100 according to an exemplary embodiment of the present invention can control a feedback operation of the latch valve 110 by using the valve control device 130 configured as described above, and when the latch valve 110 malfunctions more than a certain number of times, the latch valve 110 is controlled to perform a reverse operation so that a foreign object (or debris) can be removed from the latch valve 110 or so that the location of the latch valve 110 can be corrected.

The latch valve 110 requires high torque in its initial operation, and in this case, when a foreign object is at the latch valve 110 or the location of the latch valve 110 is not accurate, a higher torque is required to remove the foreign object from the latch valve 110 or to readjust the location of the latch valve 110. However, in the bidet without power, since a maximum value of an instant voltage which can be used is low, a maximum value of a driving torque is also low. Thus, when it is detected that the latch valve 110 is not operating smoothly, the latch valve 110 may be controlled to perform the same operation several times in order to gradually remove the foreign object or readjust the location of the latch valve 110 with the low torque. If the foreign object of the latch valve 110 is not removed or the location of the latch valve 110 is not readjusted even through a continuous operation, the latch valve 110 may perform a reverse operation to make a space allowing the foreign object to be released thereinto or the latch valve 110 may be moved in a reverse direction so as to be readjusted.

Figure 3:
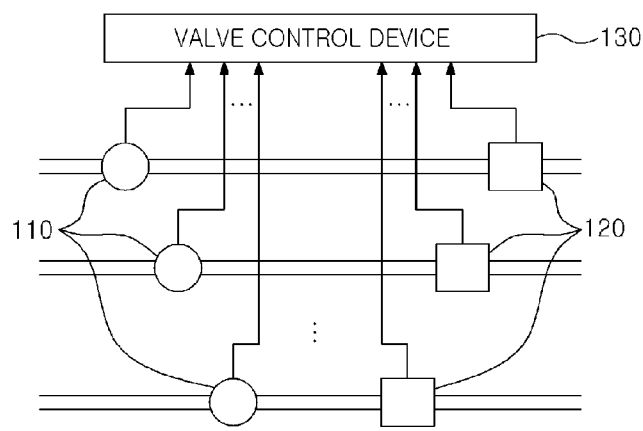
FIG. 3 is a view showing a valve control system and waterway pipes in a bidet employing the valve control system according to an exemplary embodiment of the present invention.

FIG. 3 is a view showing a valve control system and waterway pipes in a bidet employing the valve control system according to an exemplary embodiment of the present invention.

With reference to FIG. 3, the bidet according to an exemplary embodiment of the present invention includes a plurality of waterway pipes, and one or more latch valves 110 and flow rate sensors 120 may be installed in each of the waterway pipes with which the operation of the latch valve 110 is required to be controlled.

The valve control device 130 may collect flow rate measurement values of the respective waterway pipes to control the operation of each of the latch valves 110. Controlling the operations of the latch valves 110 and the flow rate sensors 120 of the individual waterway pipes have been described in detail, so a description thereof will be omitted.

Figure 4:
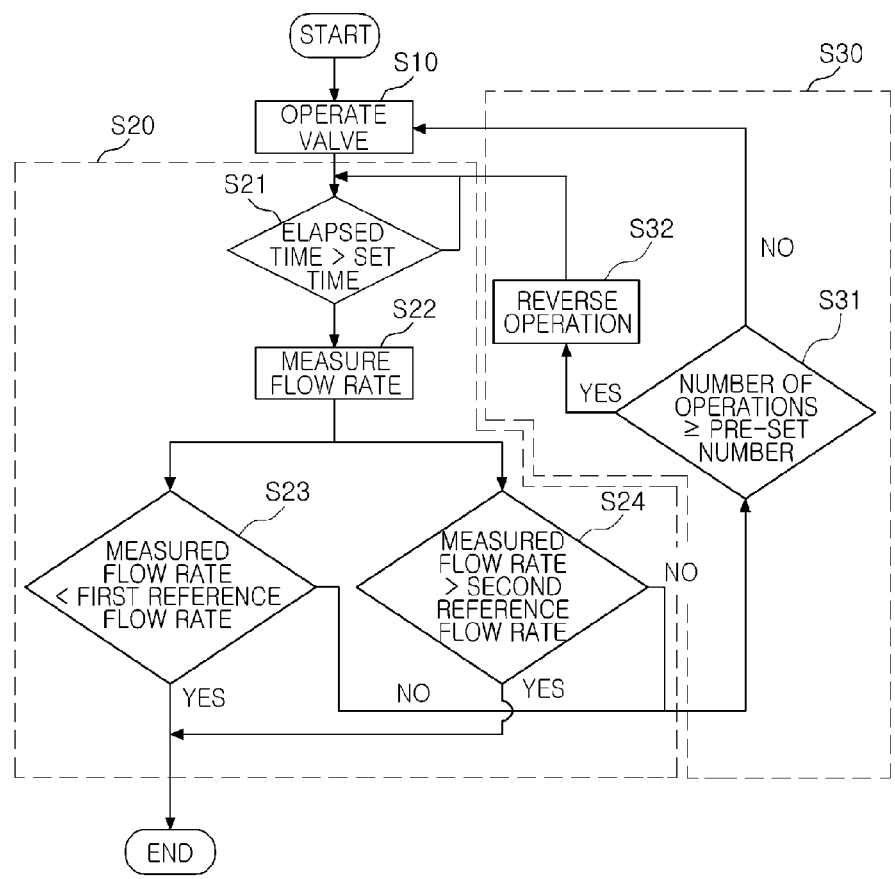
FIG. 4 is a flow chart illustrating a process of a valve control method using the valve control system according to an exemplary embodiment of the present invention.

FIG. 4 is a flow chart illustrating the process of a valve control method using the valve control system according to an exemplary embodiment of the present invention.

With reference to FIG. 4, the valve control method according to an exemplary embodiment of the present invention may include a valve operation step S10 and a malfunction determination step S20. The valve control method may further include a reverse operation step S30.

The valve control method according to an exemplary embodiment of the present invention uses the valve control system including the latch valve 110 and the flow rate sensor 120. In the valve control method according to an exemplary embodiment of the present invention, the latch valve 110 is operated, and then, whether or not the latch valve 110 is malfunctioning is determined. When the latch valve 110 is malfunctioning, the latch valve is controlled to operate again or to perform a reverse operation.

In the valve operation step S 10, the latch valve 110 is opened or shut. Preferably, in the valve operation step S10, the latch valve 110 is controlled to perform only an ON/OFF operation, thus increasing accuracy in control. However, if necessary, the amount of opening or shutting the latch valve 110 may be controlled in a stepwise manner.

In the malfunction determination step S20, whether or not the latch valve 110 is malfunctioning is determined by using a flow rate value measured by the flow rate sensor 120. When the latch valve 110 has malfunctioned, the valve operation step S10 is performed again.

The malfunction determination step S20 may include a flow rate measurement step S22 and operation determination steps S23 and S24.

The measurement of a flow rate is required to be delayed until when there is no change in the flow rate according to the operation of the latch valve 110. Thus, the measurement of a flow rate is performed after the lapse of a pre-set delay time (step S21).

In the flow rate measurement step S22, when the pre-set delay time has elapsed (step S21), a flow rate in the waterway pipe is measured by using the flow rate sensor 120. The measured flow rate value may be used to determine whether or not the latch valve 110 has operated normally.

In the operation determination steps S23 and S24, the measured flow rate value is compared with the first or second reference flow rate value to determine whether or not the latch valve 110 has malfunctioned. The operation determination steps S23 and S24 may include a shutting operation determination step S23 and an opening operation determination step S24.

In the shutting operation determination step S23, whether or not the latch valve 110 has normally performed the shutting operation by comparing the measured flow rate value with the first reference flow rate value. A maximum value of a flow value of the stream of water in the waterway pipe when the latch valve 110 has normally performed the shutting operation is the first reference flow rate value. Thus, when the latch valve 110 is controlled to perform the shutting operation, if the flow rate value measured by the flow rate sensor 120 is greater than the first reference flow rate value, it may be determined that the latch valve 110 has malfunctioned.

In the opening operation determination step S24, whether or not the latch valve 110 has normally performed the opening operation is determined by comparing the measured flow rate value with the second reference flow rate value.

A minimum value of a flow value of the stream of water in the waterway pipe when the latch valve 110 has normally performed the opening operation is the second reference flow rate value. Thus, when the latch valve 110 is controlled to perform the opening operation, if the flow rate value measured by the flow rate sensor 120 is smaller than the second reference flow rate value, it may be determined that the latch valve 110 has malfunctioned.

Although not shown, when the valve control method according to an exemplary embodiment of the present invention does not include a reverse operation, if the operation of the latch valve 110 is determined to be an erroneous operation in operation determination steps S23 and S24, the valve operation step S10 may be performed again. Namely, when the opening operation of the latch valve 110 has been erroneously performed, the opening operation is performed again, and when the shutting operation of the latch valve 110 has been erroneously performed, the shutting operation is performed again.

When the valve control method according to an exemplary embodiment of the present invention includes the reverse operation step S30, if the operation of the latch valve 110 is determined to be an erroneous operation, the reverse operation step S30 is performed.

In the reverse operation step S30, when the valve operation step S10 has been performed by more than a pre-set number of times in step S31, the latch valve 110 is controlled to perform a reverse operation of the operation which was performed in the valve operation step S 10 in step S32. If necessary, when the reverse operation step S30 is performed, the number of times the valve operation step S10 has been re-performed can be initialized. Namely, in the valve control method according to an exemplary embodiment of the present invention, the latch valve 10 can be controlled to perform the re-operation and the reverse operation continuously.

Although not shown, after the reverse operation step S32 is performed, the valve operation step S10 may be performed when the pre-set delay time has elapsed. The reverse operation is not a desired operation of the latch valve 110, so when a cause of the malfunction of the latch valve 110 is removed through the reverse operation, a desired operation may be performed after the lapse of the pre-set delay time.

Also, although not shown, when a malfunction is detected even after the reverse operation step S30, a process of operating the latch valve 110 by temporarily increasing the voltage of the latch valve 110 may be performed or a process of notifying a failure of the latch valve 110 may be performed as necessary.

An example of performing the valve control method according to an exemplary embodiment of the present invention will now be described.

When a user terminates the use of the bidet, the bidet outputs cleansing water to cleanse a nozzle. To this end, the latch valve 110 for controlling a stream of water of the waterway pipe supplying cleansing water must be open. The valve control method in this situation will be described.

In the valve operation step S10, the latch valve 110 is controlled to be open.

In the flow rate measurement step S22, when a pre-set delay time of one second has elapsed in step S21, a flow rate in the waterway pipe is measured by using the flow rate sensor 120.

In the opening operation determination step S24, when the measured flow rate value exceeds the second reference flow rate value, it is determined that the latch valve 110 has operated normally, and the controlling of the latch valve 110 is terminated. If, however, the measured flow rate value is smaller than the second reference flow rate value, it is determined that the latch valve 110 has malfunctioned, and the valve operation step S10 is performed again. In this case, since the latch valve 110 is operated only once, the reverse operation step S30 is not performed.

If it is detected that the latch valve is malfunctioning and the number of times the valve operation step S10 is performed again reaches three in step S31, it is determined that the latch valve 110 is not operating normally through the re-operations, and the reverse operation S30 is performed.

While the present invention has been shown and described in connection with the exemplary embodiments, it will be apparent to those skilled in the art that modifications and variations can be made without departing from the spirit and scope of the invention as defined by the appended claims.

The invention claimed is:

1. A bidet comprising:
   a control device controlling an operation of the bidet upon receiving information regarding a user's bidet manipulation; and
   one or more of a waterway pipe supplying water required for operating the bidet,
   wherein one or more of the waterway pipe includes:
      one or more of latch valve controlling a stream of water in the waterway pipe, respectively; and
      one or more of flow rate sensor measuring a flow rate in the waterway pipe,
   wherein when the control device determines that the latch valve is malfunctioning if a flow rate value measured by the flow rate sensor is not within a pre-set flow rate value range corresponding to a valve operation, and performs a function of controlling the latch valve to re-operate in the occurrence of the malfunction,
   wherein the control device comprises a first timing device determining the number of re-operations of the latch valve, and
   wherein when the number of re-operations of the latch valve determined by the first timing device exceeds a pre-set number, the control device controls the latch valve to perform a reverse operation of the operation performed during the re-operations.

2. The bidet of claim 1, wherein the control device further comprises:
   a signal generator generating a control signal for controlling an operational state of the latch valve; and
   second timing device determining a timing at which the flow rate of the stream of water is to be measured.

3. The bidet of claim 2, wherein the control device further comprises a comparator comparing a flow rate value measured by the flow rate sensor with a first or second reference flow rate value,
   wherein the first reference flow rate value is used when the latch valve performs a shutting operation and is a maximum flow rate value allowed when the latch valve is shut, and the second reference flow rate value is used when the latch valve performs an opening operation and is a minimum flow rate value guaranteed when the latch valve is open.

4. The bidet of claim 1, wherein the latch valve operates upon receiving power from an external power source or upon receiving power from a power supply device which generates power by using a stream of water in the waterway pipes and supplies the generated power.

5. A valve control method using a valve control system including a bidet, a latch valve and a flow rate sensor installed in a waterway pipe, wherein a control device controls operation of the bidet upon receiving information regarding a user's bidet manipulation, and the waterway pipe supplies water for operation of the bidet, the method comprising:
   a valve operation process of opening or shutting the latch valve; and
   a malfunction determination process of determining that the latch valve is malfunctioning if a flow rate value measured by the flow rate sensor is not within a pre-set flow rate value range corresponding to a valve operation,
   wherein when the latch valve has malfunctioned, the valve operation process is performed again, and
   wherein the valve control method further comprises a valve reverse operation process of performing a reverse operation of the operation performed when the valve operation process was performed by more than a pre-set number of times.

6. The method of claim 5, wherein the malfunction determination operation comprises:
   a flow rate measurement process of measuring a flow rate when a preset time has elapsed after the valve operation process or the valve reoperation process was performed; and
   an operation discrimination process of discriminating whether or not the latch valve is malfunctioning upon comparing the measured flow rate value with the pre-set flow rate value.

7. The method of claim 6, wherein the operation discrimination process comprises:
   a shutting operation determination process of determining that the latch valve is malfunctioning when the latch valve performs an shutting operation and a measured flow rate is greater than a first reference flow rate; and
   an opening operation determination process of determining that the latch valve is malfunctioning when the latch valve performs an opening operation and a measured flow rate is smaller than a second reference flow rate,
   wherein the first reference flow rate value is used when the latch valve performs a shutting operation and is a maximum flow rate value allowed when the latch valve is shut, and the second reference flow rate value is used when the latch valve performs an opening operation and is a minimum flow rate value guaranteed when the latch valve is open.

8. The method of claim 5, wherein when the valve reverse operation process is performed, the number of times the valve operation process has been performed is initialized.

9. The method of claim 5, wherein, after the valve reverse operation is performed, when a pre-set delay time has elapsed, the valve operation process is performed.

10. The method of claim 5, wherein the latch valve operates upon receiving power from an external power source or upon receiving power from a power supply device which generates power by using a stream of water in the waterway pipe and supplies the generated power.

\* \* \* \* \*